(12) United States Patent
Sakai

(10) Patent No.: US 7,622,781 B2
(45) Date of Patent: *Nov. 24, 2009

(54) SEMICONDUCTOR DYNAMIC QUANTITY SENSOR

(75) Inventor: Minekazu Sakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 505 days.

This patent is subject to a terminal disclaimer.

(21) Appl. No.: 11/137,435

(22) Filed: May 26, 2005

(65) Prior Publication Data

US 2005/0263838 A1 Dec. 1, 2005

(30) Foreign Application Priority Data

Jun. 1, 2004 (JP) .............................. 2004-163629

(51) Int. Cl.
H01L 29/82 (2006.01)
(52) U.S. Cl. ...................................... 257/415
(58) Field of Classification Search ................. 257/415
See application file for complete search history.

(56) References Cited

U.S. PATENT DOCUMENTS 5,623,099 A 4/1997 Schuster et al.

| 6,257,061 | B1 | 7/2001 | Nonoyama et al. |
| 6,601,431 | B2 | 8/2003 | Nagahara et al. |
| 7,059,190 | B2 * | 6/2006 | Sakai et al. ............. 73/514.32 |

FOREIGN PATENT DOCUMENTS

| JP | A-05-018990 | 1/1993 |
| JP | A-07-174652 | 7/1995 |
| JP | A-09-005354 | 1/1997 |
| JP | A-9-113534 | 5/1997 |
| JP | A-2001-091263 | 4/2001 |

* cited by examiner

*Primary Examiner*—Samuel A Gebremariam
(74) *Attorney, Agent, or Firm*—Posz Law Group, PLC

(57) ABSTRACT

When movable electrodes of beam arrangement structures are displaced in a direction perpendicular to the surface of a support substrate in first and second capacitance constituent portions by action of an acceleration while carrier voltages are applied, the difference between a first capacitance and second capacitance is output from the support substrate through a third capacitance constituent portion. Under self-diagnosis, the voltage applying counter electrode portion of the self-diagnosis fixed capacitance constituent portion is set to a first potential, and a signal output counter electrode portion of the third capacitance constituent portion is set to a second potential different from the first potential, whereby the potential of the support substrate corresponding to the fixed electrode in the first and second capacitance constituent portions is forcedly changed.

6 Claims, 12 Drawing Sheets

SEMICONDUCTOR DYNAMIC QUANTITY SENSOR

CROSS REFERENCE TO RELATED APPLICATION

This application is based upon, claims the benefit of priority of, and incorporates by reference the contents of, Japanese Patent Application No. 2004-163629 filed on Jun. 1, 2004.

FIELD OF THE INVENTION

The present invention relates to a semiconductor dynamic quantity sensor.

BACKGROUND OF THE INVENTION

A capacitance type acceleration sensor which can perform self-diagnosis is disclosed in JP-A-2000-81449. This sensor will be described hereunder with reference to FIGS. 9, 10 and 11.

In plan view of FIG. 9, a beam arrangement structure 101 is formed on a substrate 100. The beam arrangement structure 101 has movable electrodes 101a displaceable in an acceleration detecting direction corresponding to the Y-direction parallel to the surface of the substrate 100. Fixed electrodes 102 and 103 are disposed on the substrate 100 so as to confront each other and so that each of the movable electrodes 101a of the beam arrangement structure 101 is sandwiched therebetween in the Y direction. When an acceleration is applied and thus the movable electrodes 101a of the beam arrangement structure 101 are displaced, the capacitance between each movable electrode 101a and each fixed electrode 102 and the capacitance between each movable electrode 101a and each fixed electrode 103 are differentially varied.

As shown in FIG. 11, this sensor has a period (phase φ1, φ2) for detecting capacitance variation under self-diagnosis and a period (phase φ3) for displacing the movable electrodes 101a. In the period (phase φ1, φ2) during which a periodically-varying signal is applied between each movable electrode 101a and each fixed electrode 102, 103 to detect the capacitance variation therebetween, the voltage corresponding to the variation of the differential capacitance comprising the movable electrode 101a and the fixed electrode 102, 103 is output by a C-V conversion circuit 200 of FIG. 10. In the period (the phase φ3 of FIG. 11) during which the movable electrodes 101a are displaced, a voltage applied to the non-inverting input terminal of an operational amplifier 201 of the C-V conversion circuit 200 of FIG. 10 is switched from Vcc/2 to a self-diagnosis voltage V1 and a pseudo acceleration is applied to the movable electrodes 101a.

The operation under the self-diagnosis will be described in detail with reference to FIG. 10.

Under the self-diagnosis, a self-diagnosis signal TEST is input to a control circuit 300. The control circuit 300 outputs a signal indicated in FIG. 11 to set a switch signal S3 to high level and also set a switch signal S3 (bar) to low level in a third period φ3. As a result, in the third period φ3, a switch 400b is closed and a switch 400a is opened, so that the self-diagnosis voltage V1 is applied to the non-inverting input terminal of the operational amplifier 201. At this time, since a switch 202 is closed, the operational amplifier 201 serves as a voltage follower, so that a potential difference V1 occurs between the movable electrode 101a and the fixed electrode 102 and a potential difference (Vcc−V1) occurs between the movable electrode 101a and the fixed electrode 103. Therefore, electrostatic forces occur between the movable electrode 101a and the fixed electrode 102 and between the movable electrode 101a and the fixed electrode 103 so as to be reciprocal to each other, and the movable electrodes 101a are forced to be displaced by the differential force of the electrostatic forces.

This electrostatic force would occur at a sufficiently higher frequency than the resonance frequency in the detection direction of the movable electrodes 101a if the frequencies of carrier signals P1, P2 of FIG. 11 are set to sufficiently higher frequencies than the resonance frequency (for example, twice or more frequency), and thus the movable electrodes 101a are set to such a state that a DC-like acceleration apparently occurs in the movable electrodes 101a. At this time, the self-diagnosis can be performed by detecting the DC-like displacement of the movable electrodes 101a as a capacitance variation.

However, the approach for performing self-diagnosis in the sensor of FIG. 9 in which the Y-direction horizontal to the substrate surface is set to the detection direction is not sufficient for a sensor in which the detection direction is a Z-direction vertical to the substrate surface because the support substrate cannot be set to a desired potential to displace the movable electrodes.

SUMMARY OF THE INVENTION

The present invention has been implemented in view of the foregoing problem, and has an object to enable self-diagnosis in a capacitance type dynamic quantity sensor for detecting a dynamic quantity applied in a vertical direction to the surface of a substrate.

As mentioned above, the approach for performing self-diagnosis in the sensor in which the Y-direction horizontal to the substrate surface is set to the detection direction may not be sufficient for a sensor in which the detection direction is a Z-direction vertical to the substrate surface because the support substrate cannot be set to a desired potential to displace the movable electrodes.

That is, in a sensor having a detection direction in the Z-direction such as the sensor shown in FIG. 12, a first capacitance constituent portion E11, a second capacitance constituent portion E12 and a third capacitance constituent portion E13 are constructed by using an SOI substrate 500 (a substrate having a thin film silicon layer 503 disposed through a silicon oxide film 502 on a silicon substrate 501) with the silicon substrate 501 as a common electrode. A first beam arrangement structure 510 formed of the thin film silicon layer 503 in the first capacitance constituent portion E11, a second beam arrangement structure 511 formed of the thin film silicon layer 503 in the second capacitance constituent portion E12 and a signal output counter electrode portion 512 formed of the thin film silicon layer 503 in the third capacitance constituent portion E13 are sectionally formed. A movable electrode 510a of the first beam arrangement structure 510 and a movable electrode 511a of the second beam arrangement structure 511 are displaceable in the Z-axis direction, and the beam length L1 of the first beam arrangement structure 510 and the beam length L2 of the second beam arrangement structure 511 are different from each other. The support substrate 501 is used under floating state, and the difference between the capacitance C1 between the movable electrode 510a in the first capacitance constituent portion E11 and the support substrate 501 and the capacitance C2 between the movable electrode 511a in the second capacitance constituent portion E12 and the support substrate 501 is output from the electrode portion 512 through the third capacitance constituent portion E13 serving as a fixed capacitor. In the case of the Z-axis detecting acceleration sensor in which the support substrate 501 is used under floating state as described above, voltages can be applied to the electrodes 510a, 511a. However, the support substrate 501 cannot be set to a desired potential to displace the movable electrodes 510a, 511a. That is, it is impossible to directly apply the self-diagnosis voltage to the support substrate 501 as shown in FIG. 13 replacing FIG. 10.

According to the semiconductor dynamic quantity sensor of the present invention, in the first capacitance constituent portion, a movable electrode portion is displaced in the direction perpendicular to the surface of a support substrate by the action of a dynamic quantity while a carrier voltage is applied to the movable electrode portion, and the capacitance between the movable electrode portion and the support substrate is varied. Furthermore, in the second capacitance constituent portion, the movable electrode portion is displaced in a direction perpendicular to the surface of the support substrate by the action of the dynamic quantity while the carrier voltage is applied to the movable electrode portion, and the capacitance between the movable electrode portion and the support substrate is varied under a state different from the variation state of the capacitance based on the displacement of the movable electrode portion of the first beam arrangement structure. Accordingly, the capacitance difference between the first beam arrangement structure and the second beam arrangement structure is output from the support substrate. Furthermore, the capacitance difference is output from the support substrate through a signal output counter electrode of a third capacitance constituent portion, and then converted to a voltage signal by a C-V conversion circuit.

Under self-diagnosis, a voltage applying counter electrode portion of a fixed capacitance constituent portion for self-diagnosis is set to a first potential, and the signal output counter electrode portion of the third capacitance constituent portion is set to a second potential different from the first potential, whereby the potential of the support substrate serving as the fixed electrode of the first and second capacitance constituent portions is forcedly varied and the movable electrode portions of the first and second capacitance constituent portions are displaced by electrostatic force, so that the self-diagnosis can be performed in the capacitance type semiconductor dynamic quantity sensor for detecting the dynamic quantity applied in the direction perpendicular to the surface of the substrate.

In the semiconductor dynamic quantity sensor described above, out of the voltage applying counter electrode portion of the fixed capacitance constituent portion for self-diagnosis and the signal output counter electrode portion of the third capacitance constituent portion, the potential of the voltage applying counter electrode portion of the fixed capacitance constituent portion for self-diagnosis in the self-diagnosis operation may be made different from that in the dynamic quantity detecting operation, or the potential of the signal output counter electrode portion of the third capacitance constituent portion may be made different from that in the dynamic quantity detecting operation.

BRIEF DESCRIPTION OF THE DRAWINGS

The above and other objects, features and advantages of the present invention will become more apparent from the following detailed description made with reference to the accompanying drawings.

DETAILED DESCRIPTION OF THE PREFERRED EMBODIMENTS

Preferred embodiments according to the present invention will be described hereunder with reference to the accompanying drawings.

First Embodiment

A first embodiment according to the present invention will be described hereunder.

Figure 1:
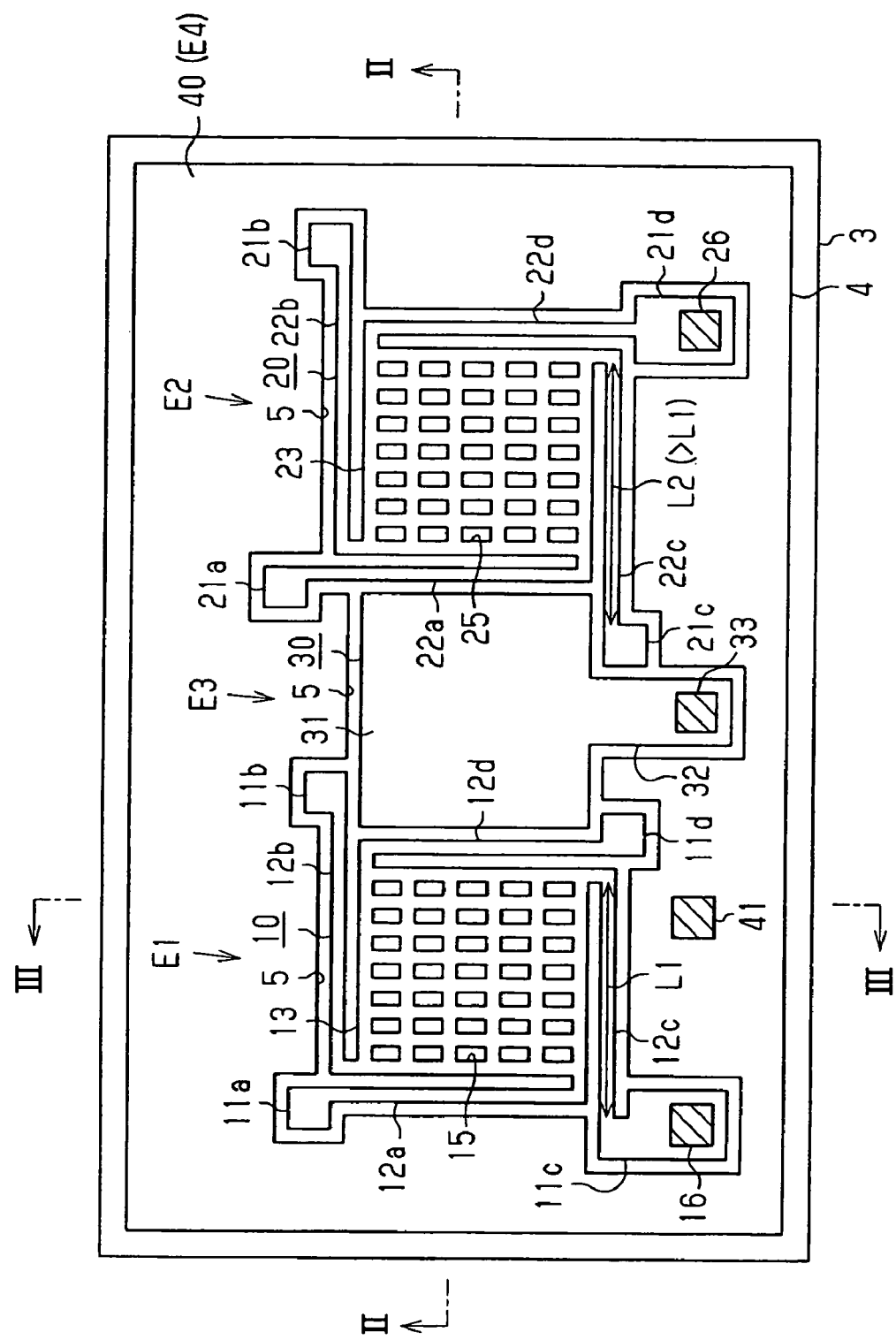
FIG. 1 is a plan view showing a semiconductor acceleration sensor according to a first embodiment.
Figure 2:
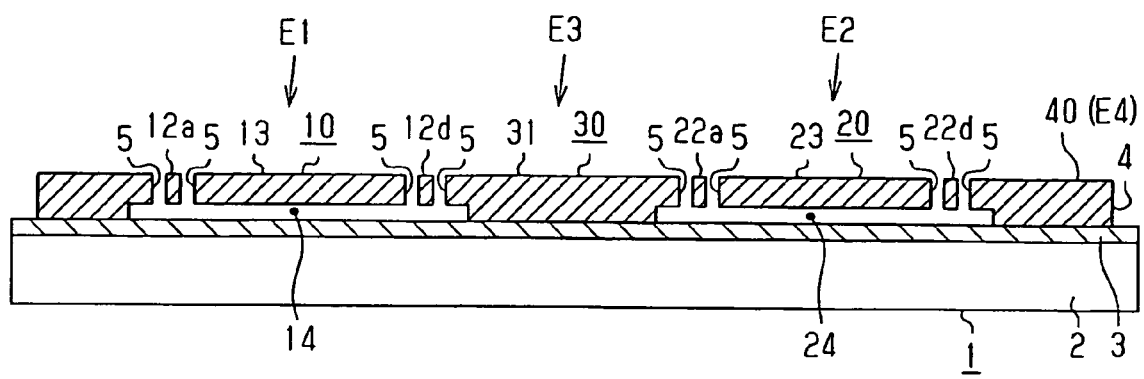
FIG. 2 is a longitudinally-sectional view taken along II-II line of FIG. 1.
Figure 3:
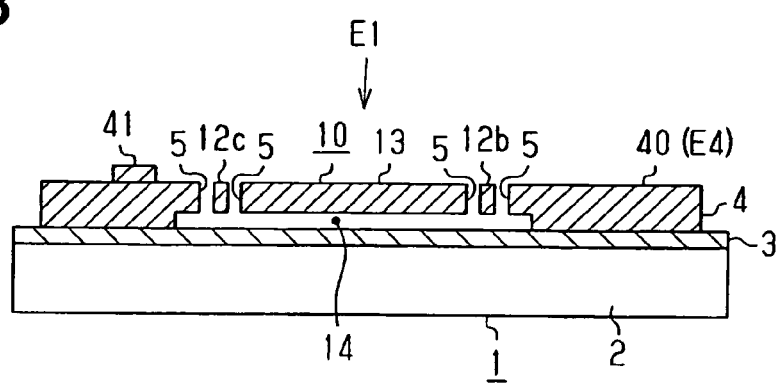
FIG. 3 is a longitudinally-sectional view taken along III-III line of FIG. 1.

This embodiment implements a differential capacitance type semiconductor acceleration sensor. FIG. 1 is a plan view showing a semiconductor acceleration sensor. FIG. 2 is a longitudinally-sectional view taken along II-II line of FIG. 1, and FIG. 3 is a longitudinally-sectional view taken along III-III line of FIG. 1. This sensor is a sensor for detecting an acceleration applied in a direction vertical (orthogonal) to the surface of the substrate.

As shown in FIG. 2, an SOI substrate 1 is used as a sensor chip, and it has such a structure that a thin film silicon layer (monocrystal silicon layer) 4 is disposed on a support substrate 2 formed of monocrystal silicon substrate through insulating film 3 formed of silicon oxide film. In a broad sense, the SOI substrate 1 is a multi-layer substrate, and the support substrate 2 is formed of semiconductor material. The thin film silicon layer 4 is formed of a thin film semiconductor layer. The thin film silicon layer 4 is achieved by disposing the monocrystal silicon substrate through the insulating film 3 on the support substrate 2 and then forming the monocrystal silicon substrate thin film thereon. The laminate body containing the support substrate 2 and the insulating film 3 is designed in a rectangular plate shape.

A first capacitance constituent portion E1, a second capacitance constituent portion E2, a third capacitance constituent portion E3 and a self-diagnosis fixed capacitance constituent portion E4 are constructed by the SOI substrate 1 (i.e., they are unified into one chip). The capacitance constituent portions E1, E2, E3 and E4 described above will be described hereunder.

Through holes 5 are formed in the thin film silicon layer 4, and the thin film silicon layer 4 is sectioned in a predetermined shape by the through holes 5. That is, first and second beam arrangement structures 10, 20 disposed at the right and left sides, a signal output counter electrode portion 30 disposed between the first and second beam arrangement structures and a frame portion 40 disposed around these members (10, 20, 30) are sectionally formed by the through holes 5. The support substrate 2 is used as a common electrode, the first capacitance constituent portion E1 is constructed by using the first beam arrangement structure 10, the second capacitance constituent portion E2 is constructed by using the second beam arrangement structure 20, the third capacitance constituent portion E3 is constructed by using the signal output counter electrode portion 30, and a self-diagnosis fixed capacitance constituent portion E4 is constructed by using the frame portion 40.

The first beam arrangement structure 10 comprises anchor portions 11a, 11b, 11c and 11d, beam portions 12a, 12b, 12c and 12d and a movable electrode portion (weight portion) 13. The anchor portions 11a, 11b, 11c and 11d are fixed onto the insulating film 3. The beam portions 12a, 12b, 12c and 12d and the movable electrode portion (weight portion) 13 are disposed on the insulating film 3 through a cavity 14 as shown in FIGS. 2 and 3. That is, the beam portions 12a, 12b, 12c and 12d extend from the anchor portions 11a, 11b, 11c and 11d, and the movable electrode portion (weight portion) 13 are joined and supported at the tip portions of the beam portions 12a, 12b, 12c and 12d. As described above, four key-patterned beams (12a, 12b, 12c, 12d) are provided, the movable electrode portion (weight portion) 13 is supported by the beam portions 12a, 12b, 12c, 12d and the movable electrode portion (weight portion) 13 is disposed so as to confront the support substrate 2 through the cavity 14.

Figure 4:
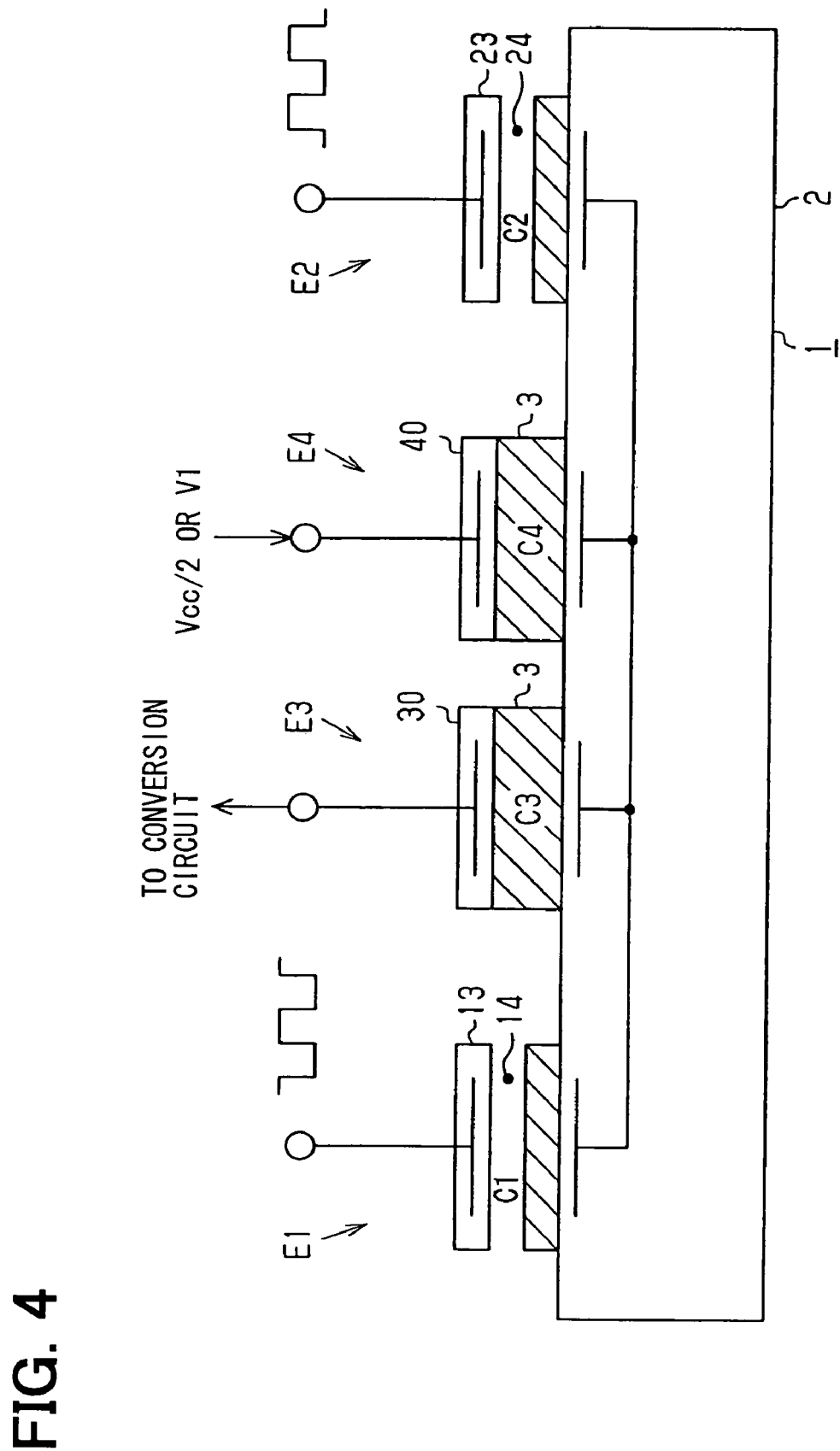
FIG. 4 is a conceptual diagram showing an electrical structure.

Furthermore, as shown in FIG. 1, open holes 15 are formed in the weight portion 13 to reduce the weight of the sensor. The movable electrode portion (weight portion) 13 is movable in a direction orthogonal to the surface of the support substrate 2 (in the up-and-down direction). As shown in FIG. 4, the capacitance (the capacitance of a capacitor) between the movable electrode portion (weight portion) 13 and the support substrate 2 is represented by C1. That is, the movable electrode portion (weight portion) 13 and the support substrate 2 serve as counter electrodes, and the capacitance between both the counter electrodes is represented by C1.

Likewise, the second beam arrangement structure 20 of FIG. 1 comprises anchor portions 21a, 21b, 21c, 21d, beam portions 22a, 22b, 22c, 22d and a movable electrode portion (weight portion) 23. The anchor portions 21a, 21b, 21c, 21d are fixed onto the insulating film 3. The beam portions 22a, 22b, 22c, 22d and the movable electrode portion (weight portion) 23 are disposed through a cavity 24 on the insulating film 3 as shown in FIG. 2. That is, the beam portions 22a, 22b, 22c and 22d extend from the anchor portions 21a, 21b, 21c, 21d, and the movable electrode portion (weight portion) 23 is joined and supported at the tip portions of the beam portions 22a, 22b, 22c and 22d. As described above, four key-patterned beams (22a, 22b, 22c, 22d) are provided, the movable electrode portion (weight portion) 23 is supported by the beam portions 22a, 22b, 22c, 22d, and the movable electrode portion (weight portion) 23 is disposed so as to confront the support substrate 2 through the cavity 24.

Furthermore, as shown in FIG. 1, open holes 25 are formed in the weight portion 23 to reduce the weight of the sensor. The movable electrode portion (weight portion) 23 is movable in a direction perpendicular to the surface of the support substrate 2 (in the up-and-down direction). As shown in FIG. 4, the capacitance (the capacitance of a capacitor) between the movable electrode portion (weight portion) 23 and the support substrate 2 is represented by C2. That is, the movable electrode portion (weight portion) 23 and the support substrate 2 serve as counter electrodes, and the capacitance between both the counter electrodes is represented by C2.

Here, the beam portions 12a to 12d, 22a to 22d have a spring function of displacing the movable electrode portions (weight portions) 13, 23 in a direction perpendicular to the surface of the support substrate 2 (in the up-and-down direction) when an acceleration in the direction concerned is applied to these beam portions and also restoring the movable electrode portions 13, 23 to the original state in accordance with dissipation of the acceleration.

In the comparison between the length L1 of the beam portion of the beam arrangement structure 10 and the length L2 of the beam portion of the second beam arrangement structure 20 in FIG. 1, the length L2 is larger than the length L1. Accordingly, when an acceleration is applied, the electrode portion 23 of the second beam arrangement structure 20 is more greatly displaced than the electrode portion 13 of the first beam arrangement structure 10. As described above, the first beam arrangement structure 10 and the second beam arrangement structure 20 are different from each other in capacitance variation when an acceleration (dynamic quantity) is applied to these beam arrangement structures.

In FIG. 1, an electrode pad (aluminum pad) 16 for wire bonding is formed on the upper surface of the anchor portion 11c formed of the thin film silicon layer. Likewise, an electrode pad (aluminum pad) 26 for wire bonding is formed on the upper surface of the anchor portion 21d formed of the thin film silicon layer.

The signal output counter electrode portion 30 of FIG. 1 comprises a square portion 31 and a belt portion 32, and the pad-forming belt portion 32 extends from the square portion 31. As shown in FIG. 2, the signal output counter electrode portion 30 is sectionally formed while the insulating film 3 comes into contact with the lower surface thereof (the signal output counter electrode portion 30 is sectionally formed while the insulating film 3 exists below the signal output counter electrode portion 30). As shown in FIG. 4, the capacitance (the capacitance of a capacitor) between the signal output counter electrode portion 30 and the support substrate 2 is represented by C3. An electrode pad (aluminum pad) 33 for wire bonding is formed on the upper surface of the belt portion 32 formed of the thin film silicon layer of FIG. 1. As shown in FIG. 4, the difference (C1−C2) between the capacitance C1 in the first capacitance constituent portion E1 and the capacitance C2 in the second capacitance constituent portion E2 is output from the support substrate 2 to the signal output counter electrode portion 30.

Furthermore, with respect to the frame portion 40 around the beam arrangement structures 10, 20 and the signal output counter electrode portion 30, the self-diagnosis fixed capacitance constituent portion E4 is constructed with the frame portion 40 as the voltage applying counter electrode portion. That is, in the self-diagnosis fixed capacitance constituent portion E4, the voltage applying counter electrode portion 40 is sectionally formed while the insulating film 3 comes into contact with the lower surface thereof in the thin film silicon layer 4 (the voltage applying counter electrode portion 40 is sectionally formed while the insulating film 3 exists below the voltage applying counter electrode portion 40). An electrode pad (aluminum pad) 41 for wire bonding is formed on the upper surface of the voltage applying counter electrode portion 40 (thin film silicon layer 4). The self-diagnosis fixed capacitance constituent portion E4 is used to forcedly change the potential of the support substrate 2. As shown in FIG. 4, the capacitance between the voltage applying counter electrode portion 40 an the support substrate 2 is represented by C4.

Figure 5A:
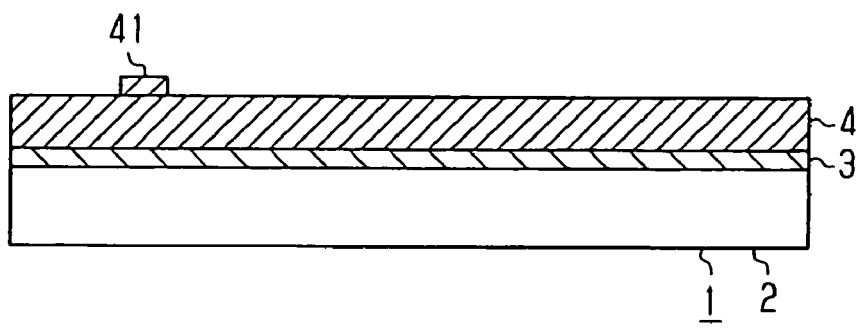
FIGS. 5A to 5C are cross-sectional views showing a manufacturing process of a semiconductor acceleration sensor.
Figure 5B:
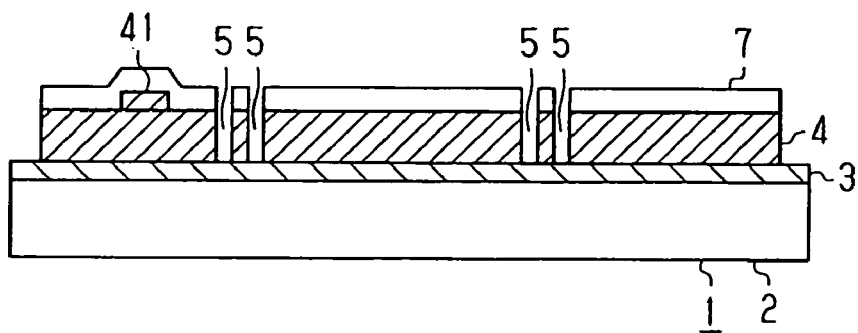
Figure 5C:
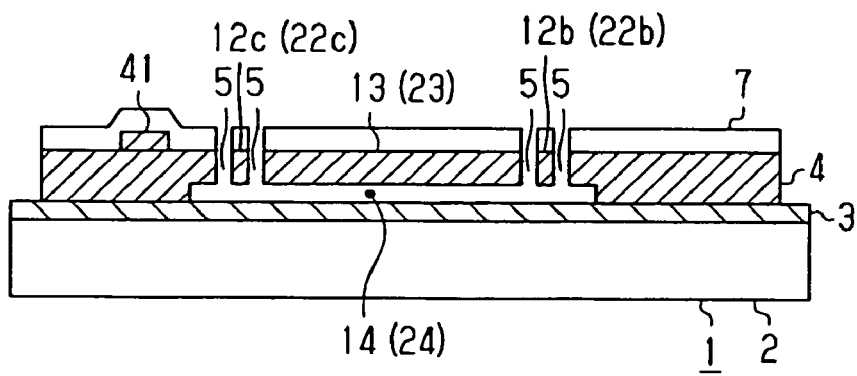

The semiconductor acceleration sensor (sensor chip) is manufactured as follows. The manufacturing process will be described with reference to FIGS. 5A to 5C. FIGS. 5A to 5C are cross-sectional views taken along line III-III of FIG. 1.

First, as shown in FIG. 5A, a wafer-type SOI substrate 1 is prepared. Thereafter, electrode pads 16, 26, 33, 41 (see FIG. 1) are formed on a thin film silicon layer 4 by using the photolithography technique and the etching technique.

Subsequently, as shown in FIG. 5B, a mask member 7 is patterned and anisotropic dry etching is carried out by using a dry etching device to form (pattern) the through holes 5 and the open holes 15, 25 extending to the insulating film (buried oxide film) 3 in the thin film silicon layer 4. Furthermore, isotropic dry etching is carried out from the surface side of the SOI substrate (wafer) 1 from which the insulating film (buried oxide film) 3 is exposed while the mask member 7 remains, whereby a portion of the thin film silicon layer 4 which comes into contact with the insulating film (buried oxide film) 3 is removed as shown in FIG. 5C. Accordingly, the movable electrode portion (weight portion) 13 and the beam portions 12a, 12b, 12c, 12d of the beam arrangement structure 10 and the movable electrode portion (weight portion) 23 and the beam portions 22a, 22b, 22c, 22d of the beam arrangement structure 20 are movable. Then, the mask member 7 is removed and also dicing is carried out to complete a sensor chip as shown in FIG. 1, etc.

According to the semiconductor acceleration sensor thus constructed, when an acceleration containing a component in the direction perpendicular to the surface of the substrate (up-and-down direction) 2 is applied, the movable electrode portions (weight portions) 13, 23 are displaced in the direction concerned. The displacement amount corresponding to the acceleration is proportional to the mass of the movable electrode portions (weight portions) 13, 23 and the restoring force of the beam portions 12a, 12b, 12c, 12d, 22a, 22b, 22c, 22d. In this case, with respect to the first capacitance C1 between the movable electrode portion 13 and the support substrate 2 and the capacitance C2 between the movable electrode portion 23 and the support substrate 2, the potential of the support substrate 2 is under floating state as shown in FIG. 4, and variation of the capacitance (capacitance difference) appears in the substrate 2.

In this embodiment, the first capacitance C1 and the second capacitance C2 are set to be equal to each other when no acceleration is applied. That is, C1=C2 is satisfied in the beam arrangement structures 10, 20 arranged at the right and left sides in FIG. 1.

Figure 6:
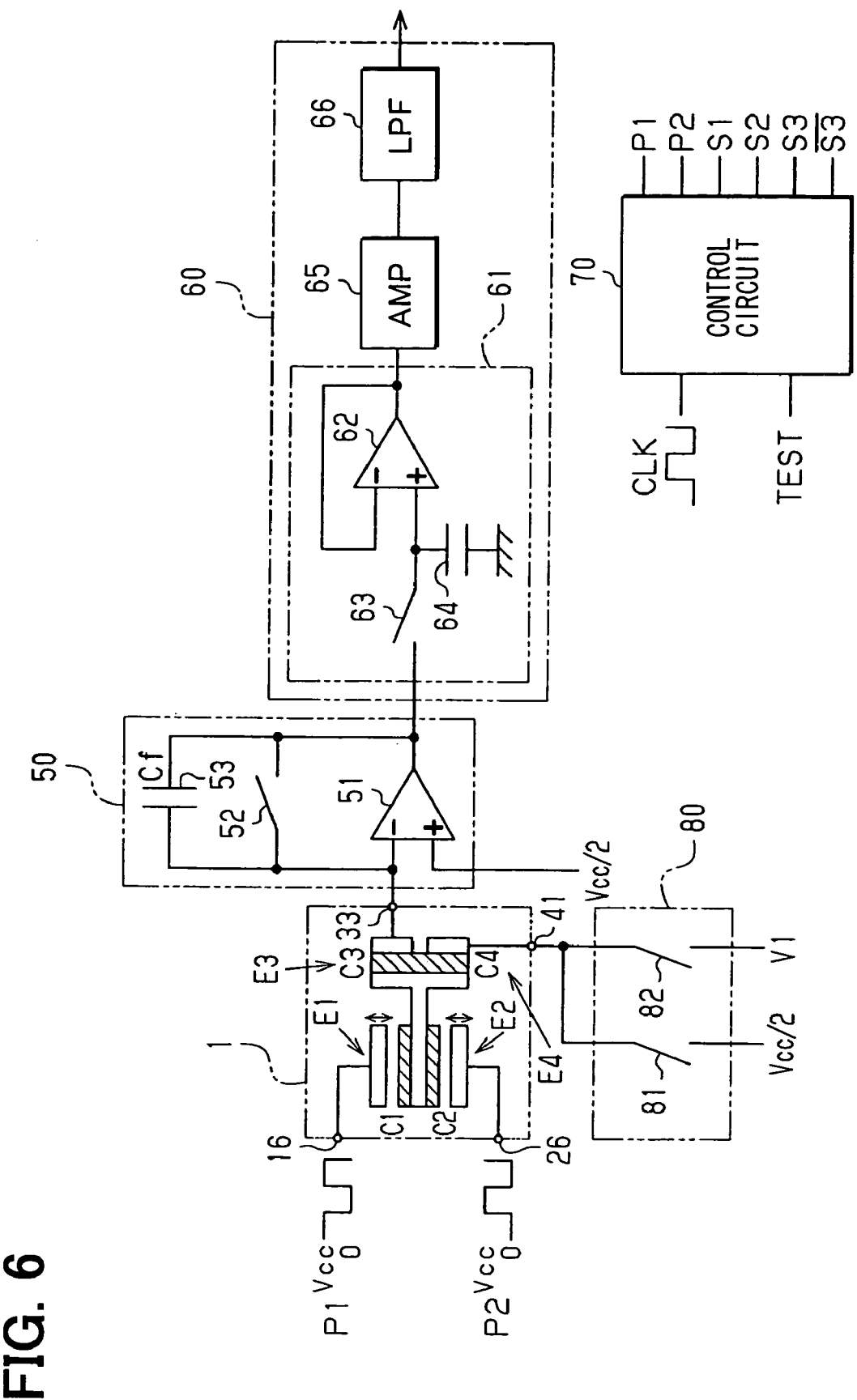
FIG. 6 is a diagram showing the circuit construction of the semiconductor quantity sensor.

FIG. 6 is a diagram showing the circuit construction. In FIG. 6, a C-V conversion circuit (capacitance variation detecting circuit) 50 is connected to a pad 33, and the variation of electrostatic capacitance can be detected by the C-V conversion circuit 50. A signal processing circuit 60 is connected to the output terminal of the C-V conversion circuit 50, and a control circuit 70 is provided. Furthermore, a switch circuit 80 is connected to a pad 41.

In FIG. 6, carrier signals P1, P2 are applied to pads 16, 26 (movable electrode portions 13, 23). The carrier signals P1, P2 are pulse waves, and 0 Volt and Vcc (for example, 5 volts) are used as the voltage level. In the first capacitance constituent portion E1, the movable electrode portion 13 is displaced in the direction perpendicular to the surface of the support substrate 2 by the action of the acceleration while the carrier voltage (P1) is applied to the movable electrode portion 13, so that the capacitance C1 between the movable electrode portion 13 and the support substrate 2 is varied. Furthermore, in the second capacitance constituent portion E2, the movable electrode portion 23 is displaced in the direction perpendicular to the surface of the support substrate 2 by the action of the acceleration while the carrier voltage (P2) is applied to the movable electrode portion 23, so that the capacitance C2 between the movable electrode portion 23 and the support substrate 2 is varied under a variation state different from the variation state of the capacitance C1 based on the displacement of the movable electrode portion 13 of the first beam arrangement structure 10, and the capacitance difference between the capacitance C1 and C2 is output from the support substrate 2. The capacitance difference is further output from the support substrate 2 to the signal output counter electrode portion 30 of the third capacitance constituent portion E3, and then a sensor output signal is achieved through the C-V conversion circuit 50 and the signal processing circuit 60. At this time, the output is represented as follows, and thus an output proportional to the capacitance (C1−C2) varying in accordance with the acceleration can be achieved.

$$C3(C1-C2)\cdot Vcc/(C1+C2+C3+C4)/Cf$$

Here, Cf represents feedback capacitance in the C-V conversion circuit 50.

A specific circuit construction will be described with reference to FIG. 6. The C-V conversion circuit 50 converts the capacitance difference (C1−C2) output of the signal output counter electrode portion 30 of the third capacitance constituent portion E3 to a voltage signal, and it comprises an operational amplifier 51, a switch 52 and a feedback capacitance (capacitor) 53. The inverting input terminal of the operational amplifier 51 is connected to the pad 33, and the switch 52 and the feedback capacitance (capacitor) 53 are connected in parallel between the inverting input terminal and the output terminal of the operational amplifier 51. A voltage of Vcc/2 is input to the non-inverting input terminal of the operational amplifier 51. Here, Vcc/2 may set to 2.5 volts, for example.

The signal processing circuit 60 is equipped with a sample and hold circuit 61, and the sample and hold circuit 61 comprises an operational amplifier 62 constituting a voltage follower, a switch 63 and a capacitor 64. The sample and hold circuit 61 samples the output voltage of the C-V conversion circuit 50 and holds it for a fixed period. A low-pass filter (LPF) 66 is connected to the sample and hold circuit 61 through an amplifying circuit (AMP) 65. The amplifying circuit 65 amplifies the output voltage of the sample and hold circuit 61 to predetermined sensitivity, and the low pass filter 66 outputs only components of a predetermined frequency band from the output voltage of the amplifying circuit 65 as an acceleration detecting signal.

The switch circuit 80 is used to apply any one of the voltage of Vcc/2 and the voltage of V1 from the respective voltage sources (not shown) to the pad 41, and it comprises a switch 81 and a switch 82. Here, Vcc/2 is set to 2.5 volts, for example. V1 is larger than Vcc/2, and it may be set to 2.5 to 10 volts, for example. The switch 81 and the switch 82 are set so that when one of the switches is closed, the other switch is opened.

On the basis of a reference clock CLK and a self-diagnosis signal TEST, the control circuit 70 generates and outputs the carrier signals P1, P2 of Vcc in amplitude to be applied to the pads 16, 26 and the switch signals S1, S2, S3 (bar), S3 for opening/closing the switches 52, 63, 81 and 82. Each of these switches is constructed by switch means such as a semiconductor switch or the like, and closed when the switch signal from the control circuit 70 has high level. The switch signal S3 (bar) is a signal achieved by inverting the switch signal S3.

The operation of the above construction will be described with reference to the signal waveform diagram of FIG. 7.

Each of the carrier signals P1, P2 output from the control circuit 70 is a rectangular wave signal having constant amplitude which varies between high level (Hi) and low level (Lo) in three periods φ1 to φ3, and the carrier wave signal P2 is a signal achieved by inverting the voltage level of the carrier wave signal P1.

In this embodiment, the first and second periods φ1 and φ2 correspond to periods during which there is capacitance variation and the period φ3 corresponds to a period during which the movable electrode is displaced.

Figure 7:
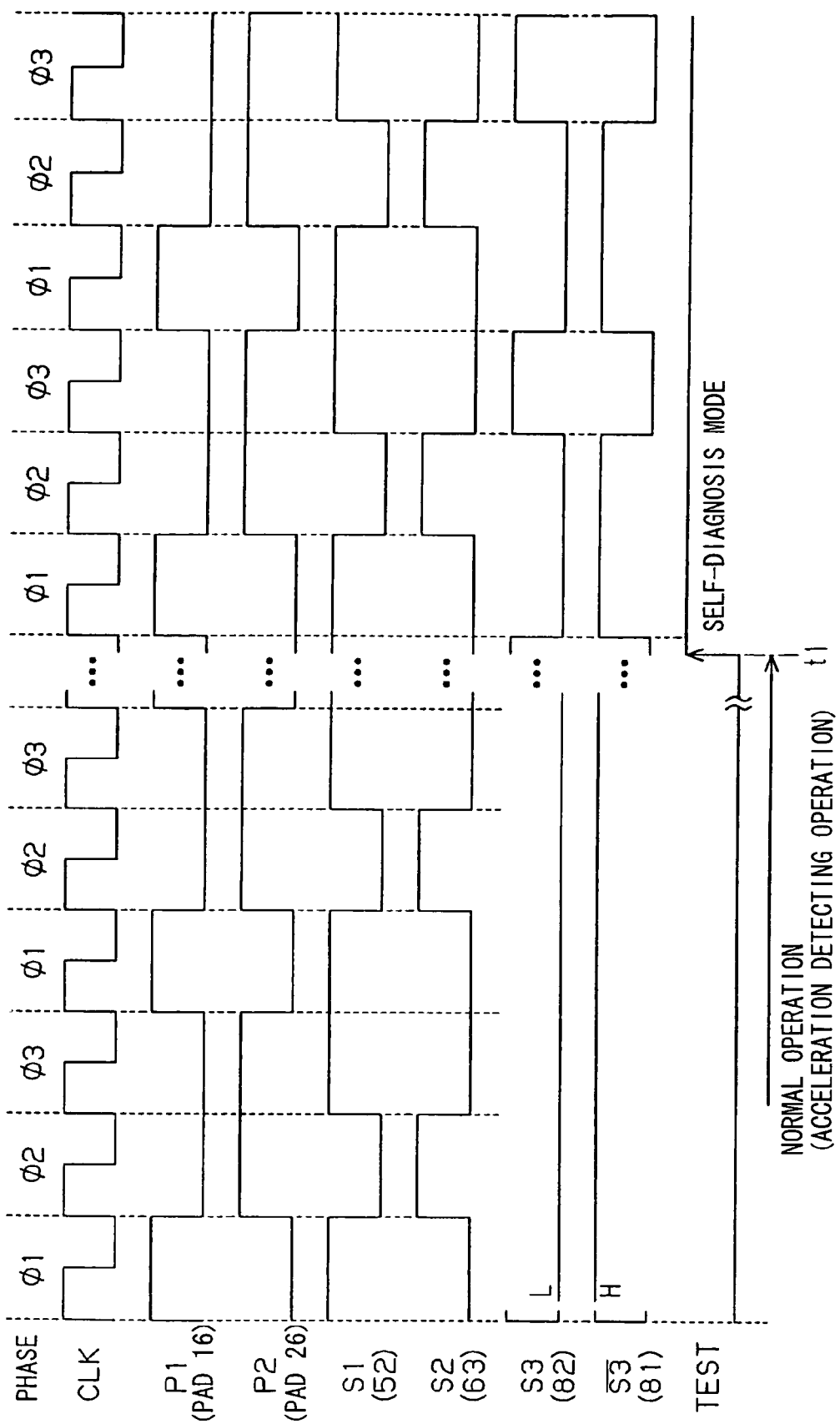
FIG. 7 is a diagram showing signal waveforms.

The TEST signal is maintained at a L level until the timing t1 of FIG. 7, and a normal operation is carried out. The action in the normal operation will be described.

In the first period φ1, the carrier signal P1 is set to Hi and the carrier signal P2 is set to Lo. Furthermore, the switch 52 is closed, the switch 63 is opened, the switch 81 is closed and the switch 82 is opened by the switch signals S1, S2, S3 (bar), S3 from the control circuit 70. Accordingly, Vcc/2 is applied to the pad 41, and the voltage of Vcc/2 is applied to the non-inverting input terminal of the operational amplifier 51, so that the voltage of Vcc/2 is applied to the pad 33 and also the charges of the feedback capacitance (capacitor) 53 are discharged.

Under this state, the charge of C1·(Vcc−Vx) is stored in the first capacitance constituent portion E1, the charge of C2·Vx is stored in the second capacitance constituent portion E2, and the charge of C3·Vx is stored in the third capacitance constituent portion E3.

Here, Vx represents the potential of the support substrate 2, and it satisfies the following equation:

$$Vx = \{Vcc \cdot C1 + (Vcc/2) \cdot C3\}/(C1+C2+C3+C4)$$

In the second period φ2, the voltage level of the carrier signal P1, P2 is inverted (P1 is set to Lo, and P2 is set to Hi), and the switch 52 is opened while the switch 63 is closed. At this time, the difference in charge of the third capacitance constituent portion E3 is represented as follows:

$$\Delta Q = C3 \cdot (C1-C2) \cdot Vcc/(C1+C2+C3+C4)$$

As a result, this charge is trapped in the feedback capacitance (capacitor) 53, a voltage of (ΔQ/Cf+Vcc/2) occurs at the output terminal of the operational amplifier 51, and the voltage corresponding to the difference in capacitance (C1−C2) is output. This voltage is sampled and held by the sample and hold circuit 61, and then output as an acceleration detecting signal through the amplifying circuit 65 and the low pass filter 66. That is, the sample and hold circuit 61 samples the output voltage of the operational amplifier 51 during the period φ2, and holds the voltage thus sampled during the other period. On the basis of the output voltage from the sample and hold circuit 61, the acceleration detecting signal is output through the amplifying circuit 65 and the low pass filter 66.

In the third period φ3 corresponding to the period during which the electrode is displaced, the switch 81 is closed and the voltage of Vcc/2 is applied to the pad 41 in the normal operation. Furthermore, the switch 52 is also closed, and thus the operational amplifier 51 serves as a voltage follower, so that the voltage of Vcc/2 is applied to the pads 33, 41. Under this state, only weak electrostatic force occurs due to the potential difference of Vcc/2 between the pad 33, 41 and the pad 16, 26, and thus no electrostatic force which can displace the movable electrode portions 13, 23 occurs. That is, no electrostatic force which generates a pseudo-acceleration as described later occurs. Accordingly, in the normal operation, the action during the period φ1 to φ3 is repeated, and when the movable electrode portions 13, 23 suffer an acceleration and thus is displaced, the acceleration detecting signal is output from the signal processing circuit 60 in connection with the acceleration.

At the timing t1 of FIG. 7, the TEST signal rises up, and self-diagnosis is carried out. The operation of the self-diagnosis will be described.

In the self-diagnosis operation, the control circuit 70 outputs the following instruction signal in response to the self-diagnosis signal TEST. In the third period φ3, the switch signal S3 is set to high level, and the switch signal S3 (bar) is set to low level. As a result, in the third period φ3, the switch 82 is closed, and the switch 81 is opened, so that the voltage of V1 is applied to the pad 41 (voltage applying counter electrode portion 40).

At this time, the switch 52 is closed, and thus the operational amplifier 51 serves as a voltage follower, so that the voltage of Vcc/2 is applied to the pad 33 (signal output counter electrode portion 30). As a result, the potential Vk of the support substrate is represented by the following equation 1.

$$Vk = \{Vcc \cdot C2 + (Vcc/2) \cdot C3 + V1 \cdot C4\}/(C1+C2+C3+C4) \qquad \text{equation 1}$$

Accordingly, the potential difference of Vk occurs in the first capacitance constituent portion E1, and the potential difference of Vk−Vcc occurs in the second capacitance constituent portion E2. This potential difference generates the force for displacing the movable electrode portions 13, 23. If the frequencies of the carrier signals P1, P2 are set to be sufficiently higher (for example, the frequencies of twice or more) than the resonance frequency of the movable electrode portions 13, 23 in the acceleration detecting direction, this electrostatic force can be generated at a sufficiently higher frequency than the resonance frequency of the movable electrode portions 13, 23, and thus a state that a DC-like acceleration occurs in the movable electrode portions 13, 23 is apparently established. The self-diagnosis can be carried out by detecting the DC-like displacement of the movable electrode portions 13, 23 at this time as a capacitance variation. Specifically, disadvantages such as the movable electrode portions 13, 23 being in a state that they cannot be freely displaced for some reason, or the like can be determined.

As described above, the self-diagnosis can be performed by applying the self-diagnosis voltage to the support substrate 2 (unmovable electrode). That is, in the semiconductor acceleration sensor for detecting an acceleration applied in the direction vertical to the surface of the substrate, the capacitance variation between the movable electrode portion 13, 23 and the support substrate 2 is detected while the potential of the support substrate 2 is set to a floating state, and a periodical voltage is applied to the capacitor which has no capacitance variation (self-diagnosis fixed capacitance constituting portion E4) under acceleration, thereby performing the self-diagnosis.

As described above, this embodiment has the following feature.

The self-diagnosis fixed capacitance constituent portion E4 is provided. The self-diagnosis fixed capacitance constituent portion E4 is formed on the SOI substrate in the form of a one-chip with first, second and third capacitance constituent portions E1, E2, E3, and the voltage applying counter electrode portion 40 is sectionally formed in the thin film silicon layer 4 while the insulating film 3 exists below the voltage applying counter electrode portion 40. At the self-diagnosis time, the voltage applying counter electrode portion 40 of the self-diagnosis fixed capacitance constituent portion E4 is set to the first potential V1, and the signal output counter electrode portion 30 of the third capacitance constituent portion E3 is set to the second potential (Vcc/2) different from the first potential V1, whereby the potential of the support substrate 2 corresponding to the fixed electrode of the first and second capacitance constituent portions E1, E2 is forcedly changed, and the movable electrode portions 13, 23 of the first and second capacitance constituent portions E1, E2 are displaced by electrostatic force. Specifically, with respect to the voltage applying counter electrode portion 40 of the self-diagnosis fixed capacitance constituent portion E4 and the signal output counter electrode portion 30 of the third capacitance constituent portion E3, the potential of the voltage applying counter electrode 40 of the self-diagnosis fixed capacitance constituent portion E4 at the self-diagnosis time is varied from that at the acceleration detection time. Accordingly, the self-diagnosis can be performed in the capacitance type semiconductor acceleration sensor for detecting the acceleration applied in the direction perpendicular to the surface of the substrate.

Second Embodiment

Next, a second embodiment will be described while focusing on the different points from the first embodiment.

Figure 8:
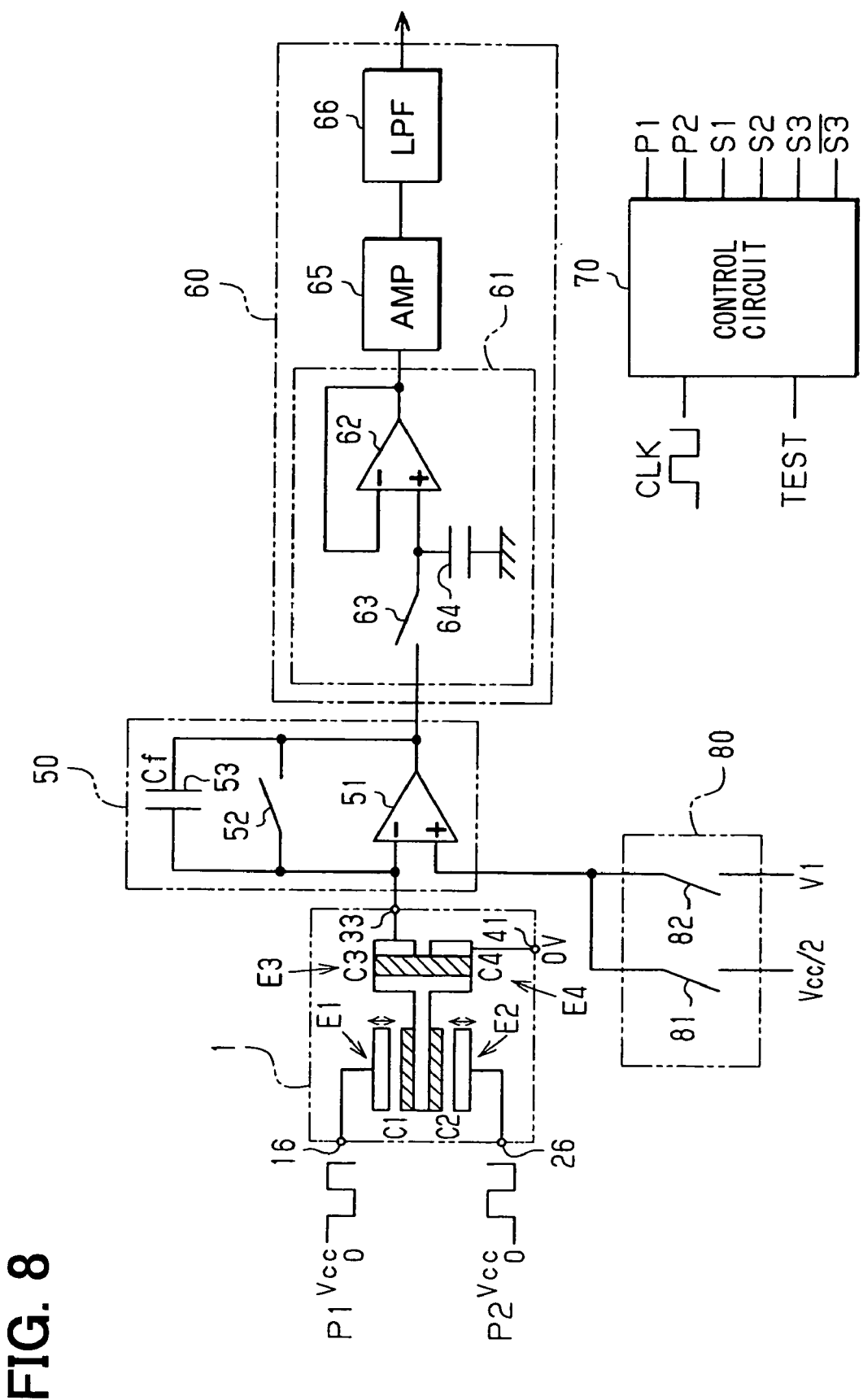
FIG. 8 is a diagram showing the circuit construction of a semiconductor quantity sensor according to a second embodiment.
Figure 9:
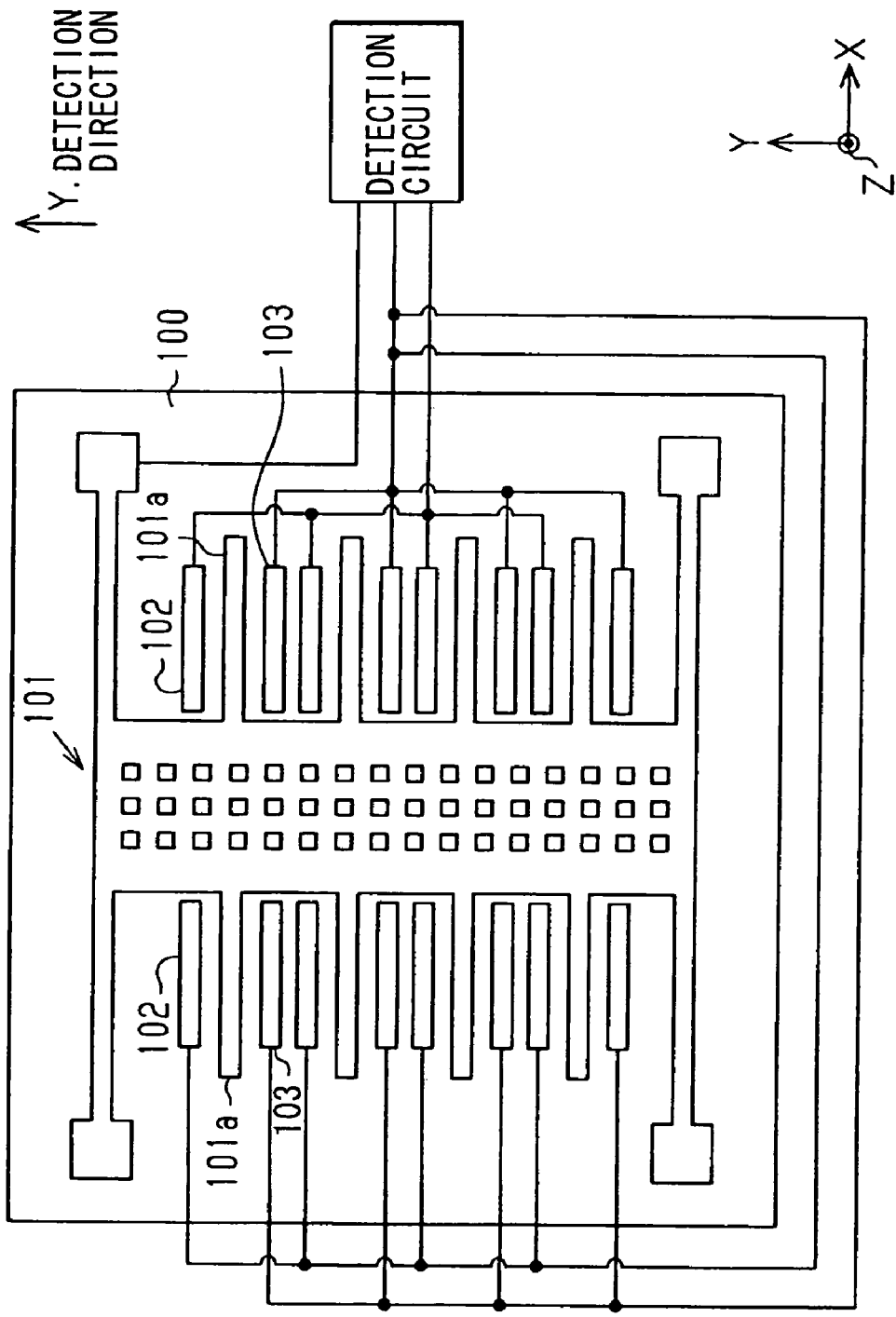
FIG. 9 is a plan view of a prior art acceleration sensor.
Figure 10:
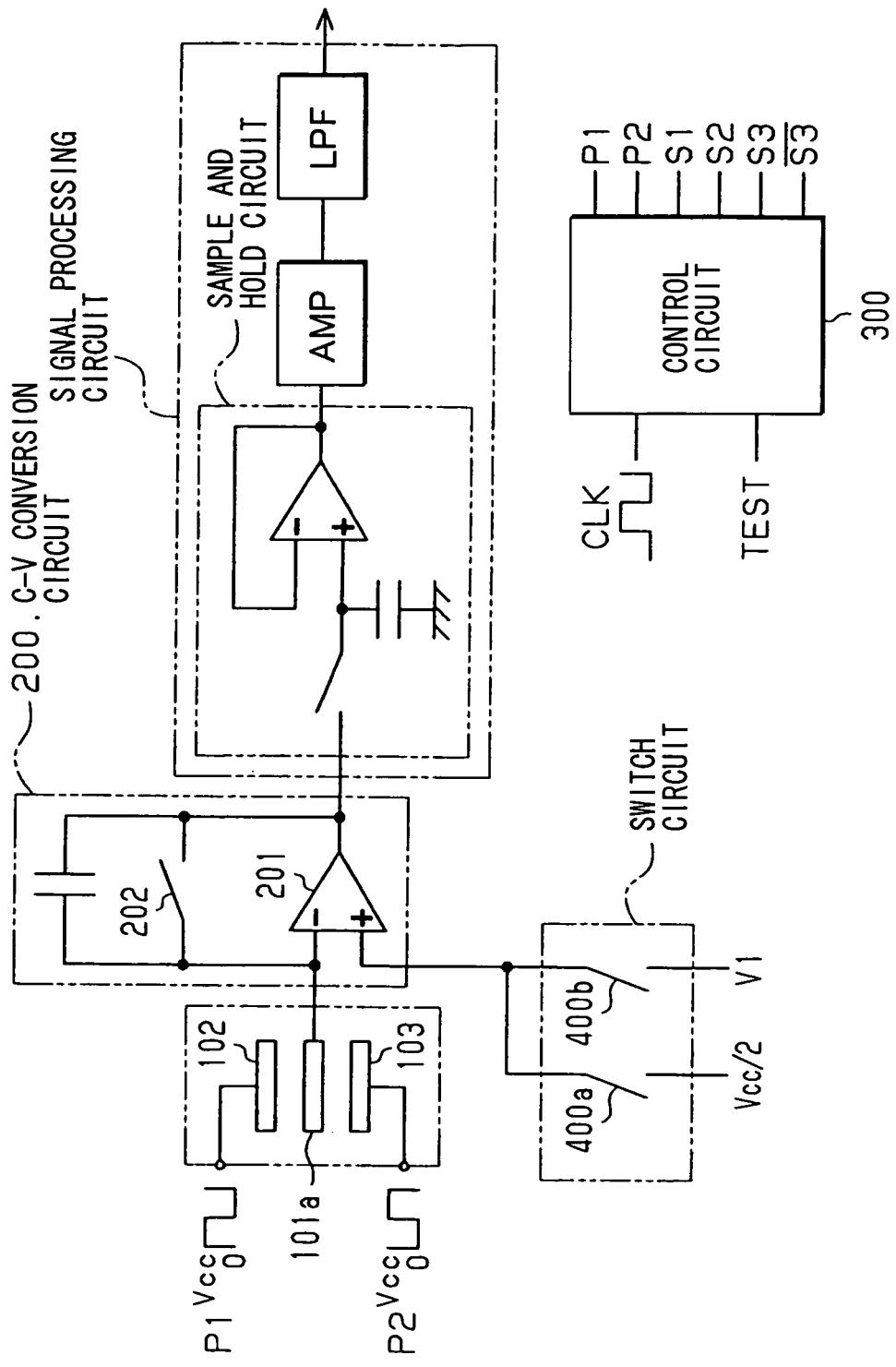
FIG. 10 is a diagram showing the circuit construction of a prior art acceleration sensor.
Figure 11:
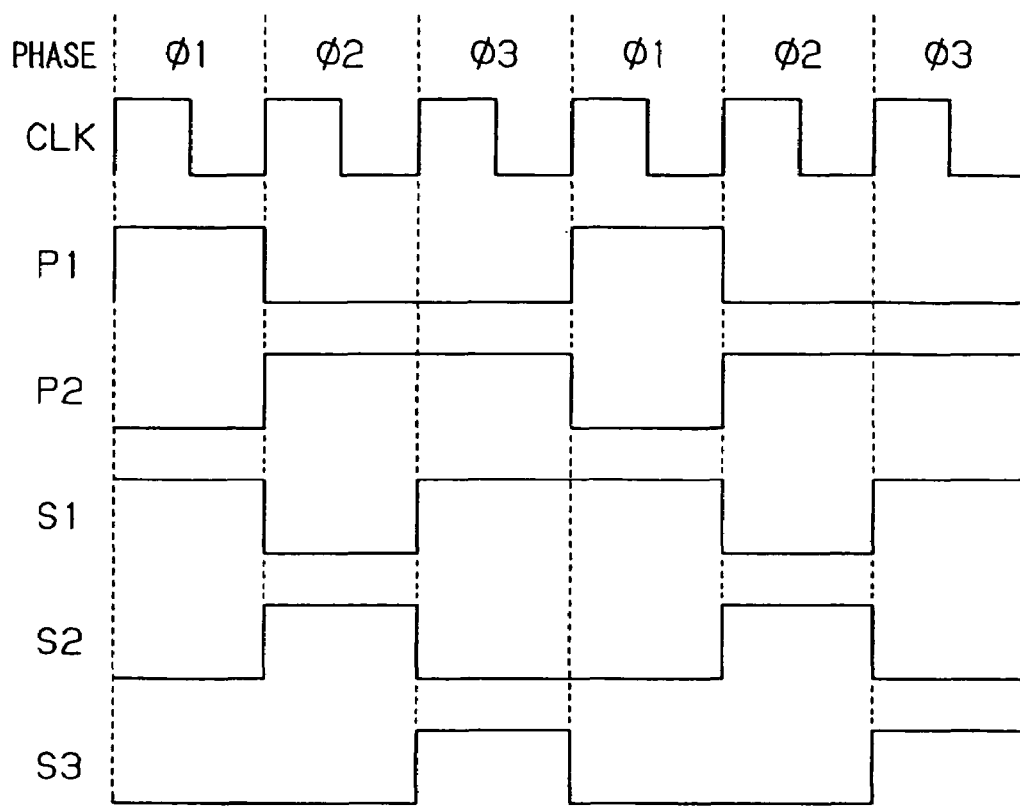
FIG. 11 is a diagram showing the signal waveforms of the acceleration sensor of FIG. 9.
Figure 12:
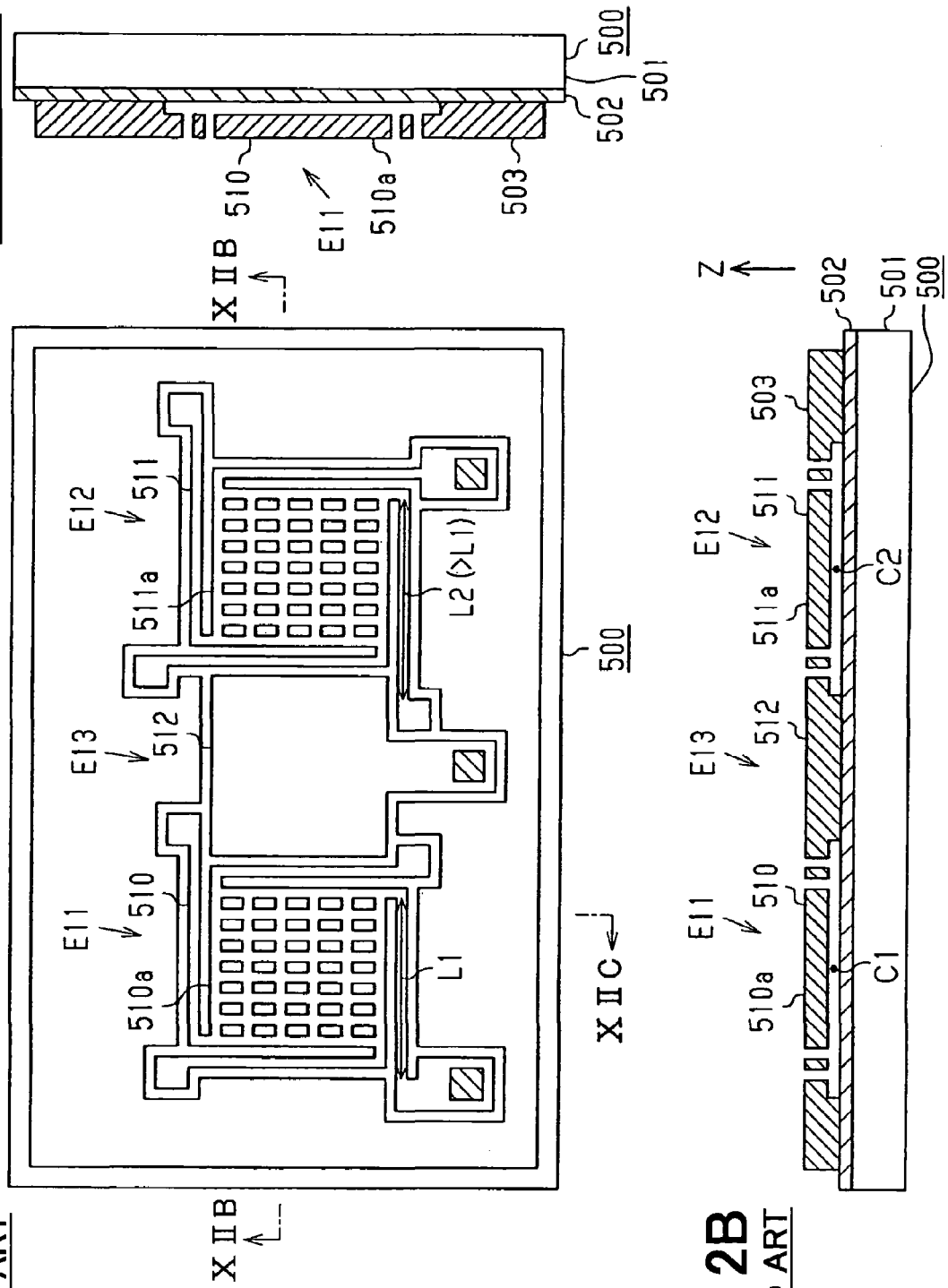
FIG. 12 is a diagram showing an acceleration sensor according to an alternative embodiment.
Figure 13:
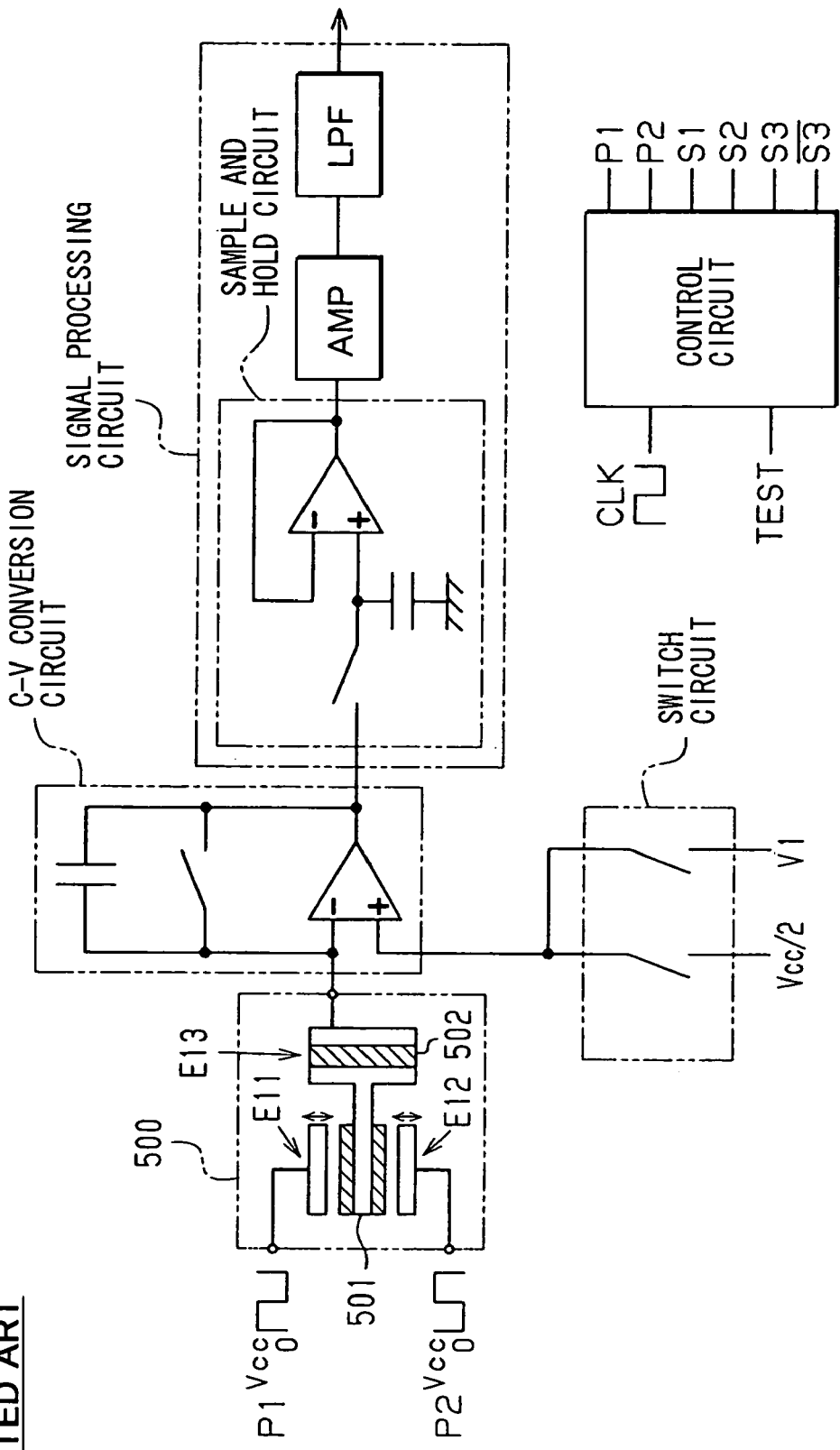
FIG. 13 is a diagram showing the circuit construction of the acceleration sensor of FIG. 12.

This embodiment has the construction of FIG. 8 in place of that of FIG. 6.

In FIG. 8, a pad 41 is grounded. A switch 80 is connected to the non-inverting input terminal of an operational amplifier 51 of a C-V conversion circuit 50. The switch circuit 80 is used to apply any one of a voltage of Vcc/2 and a voltage of V1 from respective voltage sources (not shown) to the non-inverting input terminal of the operational amplifier 51, and it comprises a switch 81 and a switch 82. The switch 81 and the switch 82 are designed so that when one of the switches is closed, the other switch is opened.

In the third period φ3 of the self-diagnosis operation, the switch signal S3 is set to high level, and the switch signal S3 (bar) is set to low level, whereby the switch 82 is closed and the switch 81 is opened. Therefore, the voltage of V1 is applied to the non-inverting input terminal of the operational amplifier 51. At this time, the switch 52 is closed, and thus the operational amplifier 51 serves as a voltage follower, so that the voltage of V1 for self-diagnosis is applied to the pad 33 (signal output counter electrode portion 30).

In this case, the potential Vk of the support substrate in the self-diagnosis operation is represented by the following equation 2:

$$Vk = (V1 \cdot C3 + Vcc \cdot C2)/(C1 + C2 + C3 + C4) \quad \text{equation 2}$$

At this time, in the comparison between the electrode area of the third capacitance constituent portion E3 and the electrode area of the self-diagnosis fixed capacitance constituent portion E4, the electrode area of the self-diagnosis fixed capacitance constituent portion E4 is still larger than the electrode area of the third capacitance constituent portion E3 as shown in FIG. 1. In this case, the capacitance C4 is still larger than the capacitance C3, and the potential of the support substrate of this embodiment is lower than the potential of the support substrate of the first embodiment from equations 1 and 2.

As described above, with respect to the voltage applying counter electrode portion 40 of the self-diagnosis fixed capacitance constituent portion E4 and the signal output counter electrode portion 30 of the third capacitance constituent portion E3, the potential of the signal output counter electrode portion 30 of the third capacitance constituent portion E3 in the self-diagnosis operation is changed from Vcc/2 in the acceleration detecting operation to V1 (>Vcc/2). Accordingly, the voltage applying counter electrode portion 40 of the self-diagnosis fixed capacitance constituent portion E4 in the self-diagnosis operation can be set to the first potential (ground potential: 0 volt), and also the signal output counter electrode portion 30 of the third capacitance constituent portion E3 can be set to the second potential V1 different from the first potential (ground potential: 0 volt). Therefore, the potential of the support substrate 2 corresponding to the fixed electrode of the first and second capacitance constituent portions E1, E2 can be forcedly changed, and the movable electrode portions 13, 23 of the first and second capacitance constituent portions E1, E2 can be displaced by the electrostatic force.

According to each of the above embodiments, in the first beam arrangement structure 10 and the second beam arrangement structure 20, the capacitance variation when the acceleration (dynamic quantity) is applied is made different by changing the length L1, L2 of the beam portions. However, the following method may be adopted.

The first beam arrangement structure 10 and the second beam arrangement structure 20 differentiate the capacitance variation under acceleration (dynamic quantity) by changing the width of the beam portions 12a to 12d and the width of the beam portions 22a to 22d.

The first beam arrangement structure 10 and the second beam arrangement structure 20 differentiate the capacitance variation under acceleration (dynamic quantity) by varying the mass or electrode area of the movable electrode portions 13, 23.

The first beam arrangement structure 10 and the second beam arrangement structure 20 differentiate the capacitance variation under acceleration (dynamic quantity) by changing the material or thickness of the insulating film 3 between the support substrate 2 and the thin film silicon layer 4.

The present invention may be applied to sensors for detecting other dynamic quantities such as a semiconductor yaw rate senor, etc. as well as the semiconductor acceleration sensor.

Next, the technical idea which can be grasped from the above embodiment and the other embodiments will be described below.

In the semiconductor dynamic quantity sensor according to the present invention, by varying the length (L1, L2) of the beam portions (12a to 12d, 22a to 22d), the first beam arrangement structure 10 and the second beam arrangement structure 20 differentiate the capacitance variation when a dynamic quantity is applied.

In the semiconductor dynamic quantity sensor according to the present invention, by varying the width of the beam portions (12a to 12d, 22a to 22d), the first beam arrangement structure 10 and the second beam arrangement structure 20 differentiate the capacitance variation when a dynamic quantity is applied.

In the semiconductor dynamic quantity sensor according to the present invention, by varying the mass or electrode area of the movable electrode portions (13, 23), the first beam arrangement structure 10 and the second beam arrangement structure 20 differentiate the capacitance variation when a dynamic quantity is applied.

In the semiconductor dynamic quantity sensor according to the present invention, by varying the material or thickness of the insulating film 3 between the support substrate 2 and the thin film semiconductor layer 4, the first beam arrangement structure 10 and the second beam arrangement structure 20 differentiate the capacitance variation when a dynamic quantity is applied.

What is claimed is:

1. A semiconductor dynamic quantity sensor comprising:
a first capacitance constituent portion having a laminate substrate including a thin film semiconductor layer disposed through insulating film on a support substrate formed of a semiconductor material, a first beam arrangement structure sectionally formed in the thin film semiconductor layer, and a first movable electrode portion of the first beam arrangement structure disposed so as to confront the support substrate through a first cavity, the first movable electrode portion being displaced in a direction perpendicular to the surface of the support substrate under action of a dynamic quantity while a first carrier voltage is applied to the first movable electrode portion to thereby vary a first capacitance between the movable electrode portion and the support substrate;
a second capacitance constituent portion that is formed on the laminate substrate in the form of a one-chip with the first capacitance constituent portion, and has a second beam arrangement structure sectionally formed in the thin film semiconductor layer, and a second movable electrode portion of the second beam arrangement structure disposed so as to confront the support substrate through a second cavity, the second movable electrode portion being displaced in a direction perpendicular to the surface of the support substrate under action of the dynamic quantity while a second carrier voltage is applied to the second movable electrode portion, whereby a second capacitance between the second movable electrode portion and the support substrate being varied in a variation state different from the variation state of the first capacitance based on the displacement of the first movable electrode portion of the first beam arrangement structure, and a differential capacitance between the first capacitance and the second capacitance being output to the support substrate;
a third capacitance constituent portion that is formed on the laminate substrate in the form of a one-chip with the first and second capacitance constituent portions, and has a signal output counter electrode sectionally formed in the thin film semiconductor layer while the insulating film exists below the signal output counter electrode portion, the differential capacitance being output by the signal output counter electrode portion;
a C-V conversion circuit for converting to a voltage signal the differential capacitance output by the signal output counter electrode portion of the third capacitance constituent portion; and
a self-diagnosis fixed capacitance constituent portion that is formed on the laminate substrate in the form of a one-chip with the first, second and third capacitance constituent portions, has a voltage applying counter electrode portion sectionally formed in the thin film semiconductor layer while the insulating film exists below the voltage applying counter electrode portion and forcedly changes the potential of the support substrate, wherein
the voltage applying counter electrode portion of the self-diagnosis fixed capacitance constituent portion under self-diagnosis is set to a first potential, and the signal output counter electrode portion of the third capacitance constituent portion is set to a second potential different from the first potential to forcedly change the potential of the support substrate serving as a fixed electrode of the first and second capacitance constituent portions, whereby the first and second movable electrodes of the first and second capacitance constituent portions are displaced by electrostatic force.

2. The semiconductor dynamic quantity sensor according to claim 1, wherein
with respect to the voltage applying counter electrode portion of the self-diagnosis fixed capacitance constituent portion and the signal output counter electrode portion of the third capacitance constituent portion, the potential of the voltage applying counter electrode portion of the self-diagnosis fixed capacitance constituent portion under self-diagnosis is varied from that under dynamic quantity detection.

3. The semiconductor dynamic quantity sensor according to claim 1, wherein
with respect to the voltage applying counter electrode portion of the self-diagnosis fixed capacitance constituent portion and the signal output counter electrode portion of the third capacitance constituent portion, the potential of the signal output counter electrode portion of the third capacitance constituent portion under self-diagnosis is varied from that under dynamic quantity detection.

4. The semiconductor dynamic quantity sensor according to claim 1, wherein
the voltage of the voltage applying counter electrode portion of the self-diagnosis fixed capacitance constituent portion is changed to a predetermined potential during a self-diagnosis state by applying the predetermined potential to the C-V conversion circuit.

5. A semiconductor dynamic quantity sensor comprising:
a plurality of movable electrodes disposed over a substrate, wherein the movable electrodes move in a direction orthogonal to a surface of the substrate in response to an applied dynamic quantity;
a plurality of fixed electrodes disposed on the substrate, wherein a differential capacitance is induced between the movable electrodes and the fixed electrodes in accordance with the movement of the movable electrodes responsive to the applied dynamic quantity;
a signal output electrode disposed on the substrate, wherein the signal output electrode outputs the differential capacitance to a CV conversion circuit; and wherein
the voltage applying counter electrode portion disposed on the substrate, wherein the potential of the voltage applying counter electrode portion is set to a first potential, and the signal output electrode is set to a second potential different from the first potential to forcedly change the potential of the substrate, which serves as the fixed electrodes, and perform a self-diagnosis operation and permit self-diagnosis.

6. The semiconductor dynamic quantity sensor according to claim 1, wherein
the potential of the substrate is changed by applying the first or second potential to the C-V conversion circuit and fixing a potential of the voltage applying counter electrode portion to ground potential.

* * * * *